(12) United States Patent
Black et al.

(10) Patent No.: US 11,987,996 B2
(45) Date of Patent: May 21, 2024

(54) TROWEL/FLOAT WITH LEVEL AND REPLACEABLE SURFACES

(71) Applicants: Robert Black, Monroe, NY (US); James Wickstead, Mendham, NJ (US)

(72) Inventors: Robert Black, Monroe, NY (US); James Wickstead, Mendham, NJ (US)

(*) Notice: Subject to any disclaimer, the term of this patent is extended or adjusted under 35 U.S.C. 154(b) by 572 days.

(21) Appl. No.: 17/194,577

(22) Filed: Mar. 8, 2021

(65) Prior Publication Data
US 2021/0189740 A1 Jun. 24, 2021

Related U.S. Application Data

(63) Continuation-in-part of application No. 16/403,529, filed on May 4, 2019, now abandoned.

(51) Int. Cl.
*E04F 21/16* (2006.01)
*G01C 9/28* (2006.01)
*G01C 9/34* (2006.01)

(52) U.S. Cl.
CPC .......... *E04F 21/163* (2013.01); *E04F 21/161* (2013.01); *G01C 9/28* (2013.01); *G01C 9/34* (2013.01)

(58) Field of Classification Search
CPC ..... E04F 21/161; E04F 21/162; E04F 21/163; E04F 21/165; E04F 21/1652
See application file for complete search history.

(56) References Cited

U.S. PATENT DOCUMENTS

| 3,166,776 A | 1/1965 | Selck |
| 4,253,214 A | 3/1981 | Bushee |
| 6,568,021 B1 | 5/2003 | Wood |
| 2015/0026907 A1 | 1/2015 | Couch |

FOREIGN PATENT DOCUMENTS

KR 10-1870167 B1 * 6/2018

* cited by examiner

*Primary Examiner* — Randall E Chin
(74) *Attorney, Agent, or Firm* — Baldini Law, LLC; Jack Baldini, Esq.

(57) ABSTRACT

This disclosure relates to a trowel and/or float having a utilitarian and adjustable level built-in for ease of use and creating uniform, properly angled, smooth surfaces, and replaceable undersides for creating various effects all in one simple to use tool.

11 Claims, 5 Drawing Sheets

TROWEL/FLOAT WITH LEVEL AND REPLACEABLE SURFACES

This is a Continuation-in-Part Application claiming priority back to application Ser. No. 16/403,529 filed on May 4, 2019, now abandoned, which in turn, claims the benefit of the prior filed U.S. Provisional Application No. 62/666,932, filed on May 4, 2018, both of which are incorporated herein by reference.

FIELD OF THE INVENTION

This disclosure relates to a trowel and/or float having a utilitarian and adjustable level built-in for ease of use and creating uniform, properly angled, smooth surfaces, and replaceable undersides for creating various effects all in one simple to use tool.

BACKGROUND

Tools for smoothing out a hard setting material before it sets have been known for ages. Over the years, trowels and/or floats, as these tools have become to be known, have been developed with different shapes, different handles, different underside surfaces that come into contact with the hard setting material to create different surface textures, and even with various angles to create slopes in the hard setting materials.

Typically, to create a sloped surface the level of skill of a worker and the independent use of several tools, such as a desired trowel and a level, and sometimes a variety of trowels and a variety of levels, would be implemented. Moreover, the desire for surface texture differences along the slope required a multitude of tools, as well.

Attempts have been made to incorporate a level within a trowel to combine the functionality into a single tool. For example, in U.S. Pat. No. 6,568,021, titled TROWEL WITH LEVELS, disclosed is, "a trowel includes a series of levels embedded in the handle for measuring the inclination of a surface being finished. The trowel includes a flat base plate, with a handle having two ends each secured to the plate to define a grip area therebetween, This construction provides an extremely rigid structure, where the handle and its included levels cannot flex angularly relative to the base plate or blade. At least one of the handle ends, and optionally both ends, includes two mutually orthogonally disposed level indicators installed therein for simultaneously measuring the level or slope of a surface being worked, in two mutually perpendicular axes. The opposite handle end may also include a pair of similarly arranged levels, if so desired. The levels may comprise bubble or spirit levels, electronic levels with audible output, and/or other level types as desired."

In another example, in U.S. Pat. No. 4,253,214, titled FINISH WORK TROWEL, disclosed is, "a plasterers trowel designed for finished coats of plaster consisting of an elongated flat rectangular rigid base plate with an elongated handle secured at one end only to the base plate. A flexible resilient essentially non-compressible trowel blade with a smooth lower surface and thickness in the order of ⅛" is secured to the base plate. The trowel blade is formed with a feathered knife edge at its periphery with the periphery of the trowel blade extending beyond the periphery of the base plate."

In another example, in U.S. Pat. No. 3,166,776, titles TROWEL WITH INTERCHANGEABLE BLADES, disclosed is, "a trowel . . . which comprises a single handle member and a plurality of interchangeable blades adapted to be readily connected to the handle."

Thus, there have been attempts and a need shown for a simple to use, all-in-one, trowel and/or float, with interchangeable blades, and built-in, easy to use levels to allow a user increased flexibility in creating sloped surfaces of varying textures. One of the shortfalls in the prior attempts is that any included level is fixed in place and requires the user to constantly monitor and approximate the angle that a tool is maintained to create a uniform slope. Another shortfall is the ease of interchangeability of blades, i.e., being able to do so during a continuous use and maintain the parallel planar orientation with the base and levels. Another shortfall is the cleanability of the overall tool when the complexity of adding levels and interchangeability of blades is introduced.

It is an object of the present disclosure to teach a device that incorporates one or more levels. The levels could be spirit levels, bubble levels, laser levels, electronic levels, audible levels, or any other type of known level that can be completely imbedded within the base of a trowel handle for easy cleaning and yet remain fully functional and adjustable.

It is another object of the present disclosure to teach a device that is rugged, lightweight, and has an easy functional interchangeable blade method to provide for a quick change for different surface textures of the hard setting underlay material.

The present disclosure teaches an ideal trowel/float including at least two mutually orthogonal level indicators that are adjustable within their housing such that, instead of the user having to maintain the level indicating the desired degree of slope, the user adjusts one of the levels to a desired slope relative to the plane of the blade and then the user maintains the trowel level indicator at center, a much easier task.

The present disclosure also teaches an ideal trowel that is rugged, light-weight, easy-to-clean and comprising an easy-off, easy-on interchangeable snap-in-place bottom blade tray—essentially a removable base which provides the ability to replace worn or damaged blade surfaces or simply change desired blade textures.

None of the disclosed prior art references or other known prior art, alone or in combination, teach the salient and proprietary features of the present disclosure as just described.

SUMMARY

The present disclosure teaches embodiments of a trowel that comprise a plurality of adjustable levels, interchangeable blade surfaces, in an injection molded frame with a rubberized overlay.

DETAILED DESCRIPTION

Figure 1:
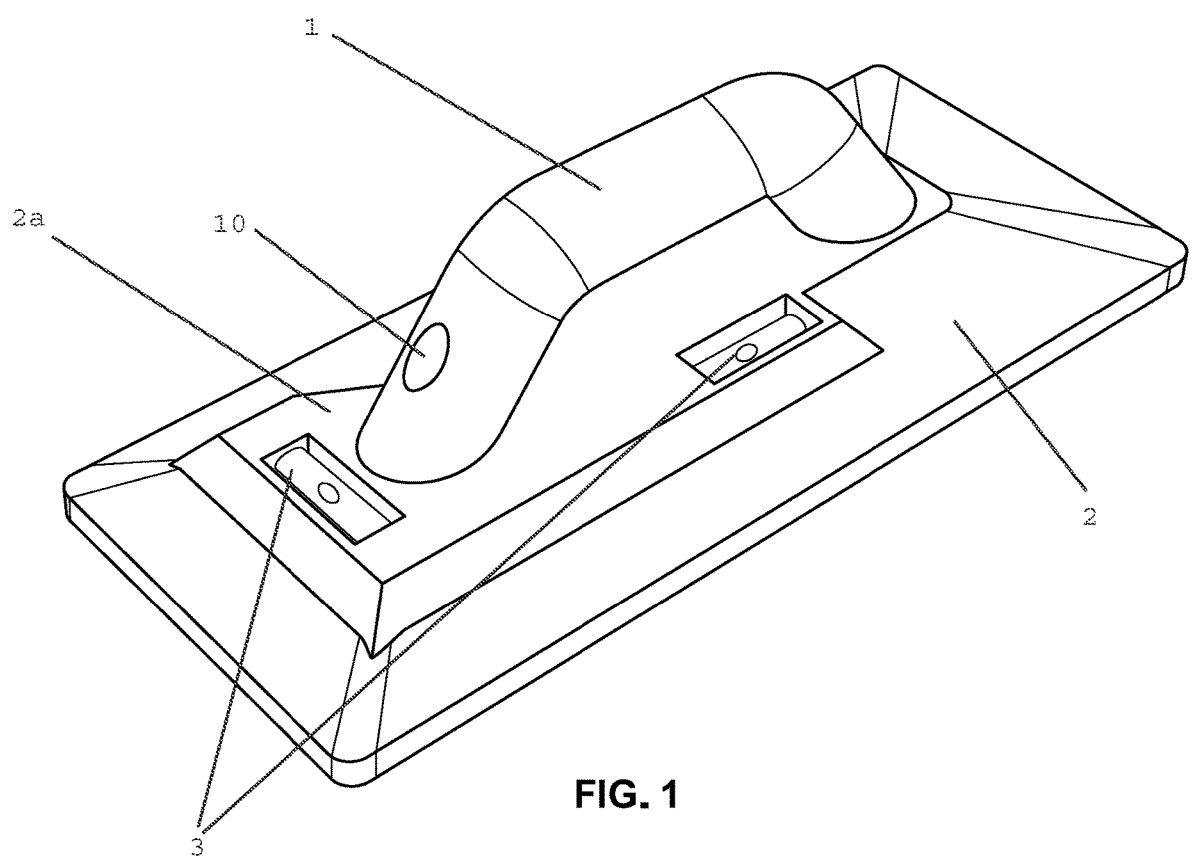
FIG. 1 depicts one embodiment of a top overview of a trowel as disclosed herein depicting a handle, a base having an area in a plane parallel to the plane of the underside working surface (not seen in this view), and a plurality of embedded adjustable levels in said area. The handle may have at least one access area to a fastening means to secure a bottom surface.

For clarity of disclosure, and not by way of limitation, the detailed description of the invention is divided into the following subsections that describe or illustrate certain features, embodiments or applications of the present invention.

Definitions

"handle" as used herein means a part of an implement by which such implement is held, carried or controlled and is generally conducive to manipulation by a human hand. It will have at least one connection point to a base and in a preferred embodiment, have two connection points for stability in maintaining a constant level reading. This part is generally seen in the figures as reference number (1).

"base" as used herein means a part of an implement attached to a handle that acts as a housing or support for the other features of the implement, namely, at least a blade and a level. As used herein, a "base" has no blade portion and is merely a receptacle configured to accept a blade. This part is generally seen in the figures as reference number (2).

'blade" as used herein means a part of an implement attached to the bottom or underside of a base of a trowel that is the part of the implement configured to come into contact with the material the trowel is designed to spread, smooth, level, texture or otherwise manipulate. This part is generally seen in the figures as reference number (4) having a working underside surface area as reference number (6).

"level" as used herein means any device or mechanism capable of determining a desired plane line or adjusting something to a horizontal plane surface or otherwise determining an imaginary line or surface of a desired plane or elevation. This part is generally seen in the figures as reference number (3).

"trowel" as used herein means an implement that is a hand tool used to spread, smooth, level, texture or otherwise manipulate concrete, plaster, mastic or other spreadable material used in the construction trades, and comprises at least a handle, a base, and a blade, and in preferred embodiments, also a level and wherein the blade is configured to be easily replaceable.

"float" as used herein means a specialized type of trowel that is used to spread grout into the grooves of tiles that have previously been laid in place and forcing the grout or other cement into place within those tile spaces.

The System and Method of the Present Invention

In one embodiment, this disclosure teaches a trowel, comprising, a base (2), a handle (1), an interchangeable blade (4) having an underside working surface area (6), and at least one configurable level (3).

In one embodiment, two levels (3) are orthogonally disposed within a special area of the base (2a) of the trowel, such special area being in a parallel plane to the plane of the underside receptacle area of the base configured to accept a blade (also in a parallel plane when attached). In one embodiment, the levels are each static such that when the base and the corresponding attached blade (4) is in the desired position, the level will indicate, against a static index line (8), how to maintain the overall tool in that desired parallel plane. In an alternative embodiment, each level is adjustable within its base housing such that if in either the front to back or the left to right plane, an angled plane is desired (as measured in a parallel plane as described), such angle can be set by manipulating the angle of the level to be the new horizontal making it easier to maintain throughout use.

In one embodiment, blades (4) of various shapes, sizes and/or textures are easily interchangeable to allow use in various environments and to create various desired textures within the surface of the material to be spread, smoothed, leveled, textured or otherwise manipulated. In one embodiment, a blade with at least an underside working surface area (6) is made of wood, desirable in some circumstances, is incorporated onto the bottom of an interchangeable blade and in this configuration, whereas wood normally warps, the blade composite here will prevent warping.

In one embodiment, a blade (4) is configured with an underside working surface area (6) molded in texture to provide "tooth" that better moves cement or other material resulting in faster and more accurate placement. In this embodiment, this feature can be ridges or teeth, angled or not, of various heights, all depending on the type of mortar or other material to be used.

In one embodiment, the handle (1) and base (2) are configured and molded from a special "slippery" plastic to provide a non-stick surface making the overall implement easy to clean.

In one embodiment, levels (3) used herein are spirit levels (levels with a bubble (7)). In an alternative embodiment, any type of known level device could be used that imparts easy readability, adjustability, and durability. In one embodiment, whatever type of level is used, it is housed in a compartment that is in an area of the base (2a) that is in a plane parallel to the plane of the underside working surface area (6) and to the blade (4) when in place and further has an adjustment feature (9) to allow the level to be adjusted to any desired angle relative to the parallel plane such that when the level indicates horizontal, the parallel plane of the blade is a desired angle from that horizontal.

In one embodiment, the base (2) is configured to accept various blades (6) through a snap-on/snap-off configuration (via a snap-on tray—the blade (4) with snap (5)) making blade interchangeability fast and easy, while maintaining the same parallel planar orientation from blade to blade. Moreover, in this embodiment, one handle/base/levels combination can be used with any number of blades and thus, blades when worn or broken do not necessitate a replacement of anything other than the worn or broken blade. In one embodiment, the snap (5) is located on the blade (4) and there is nothing to break on the base. This allows for separate "work surfaces" to be sold, each with a different texture for different applications. Additionally in this embodiment, the handle (1) may be attachable to the base through the bottom of the base making it changeable, as well, as the connection would be covered up by a snapped into place blade (for example, See FIG. 2). In one embodiment, a blade could be a composite allowing for one material (such as wood that warps with moisture contact) to be affixed onto another material (such as plastic that does not warp) creating a blade with dual properties (a wood contact surface with the non-warping features of plastic).

Figure 2:
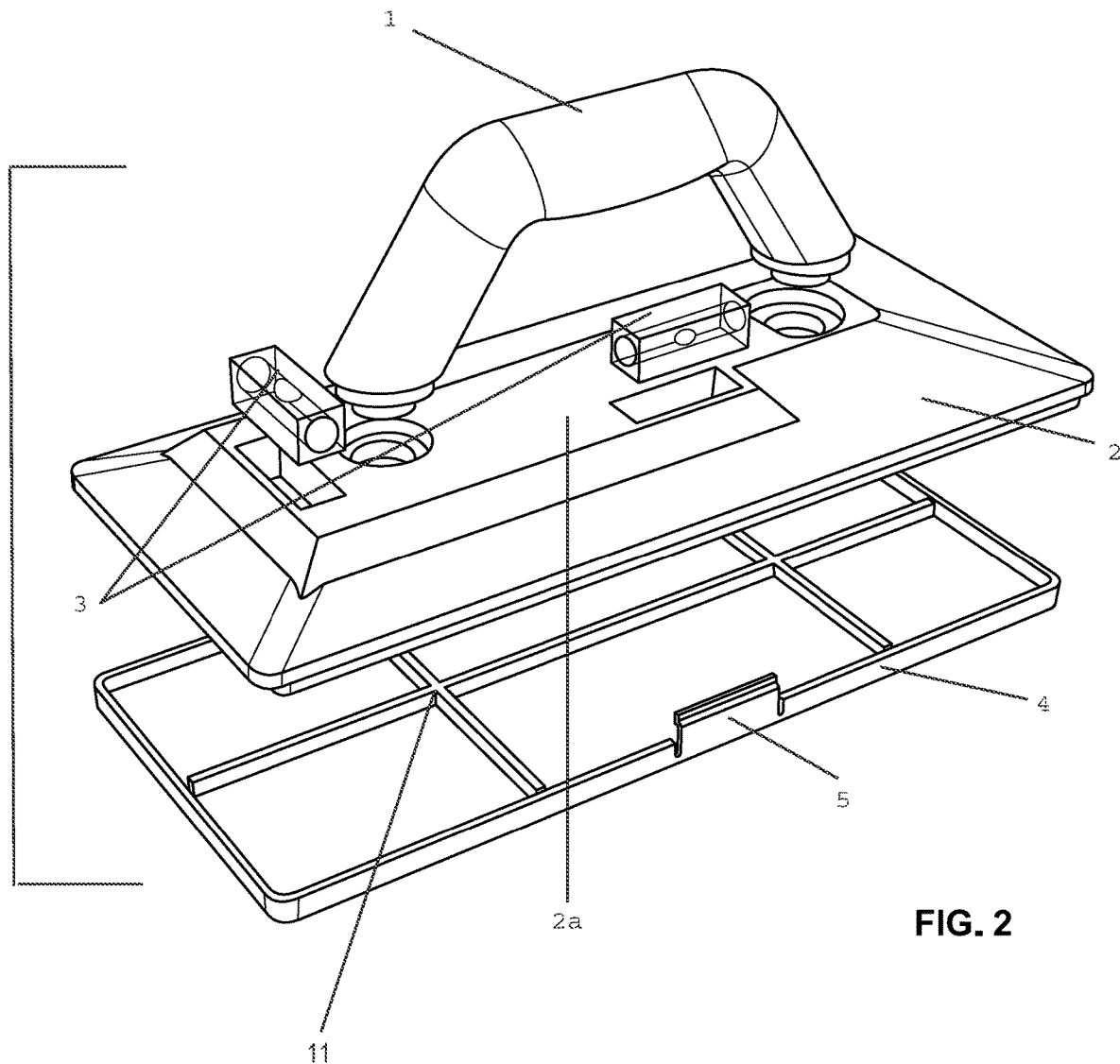
FIG. 2 depicts one embodiment of a top overview of a trowel as disclosed herein in an exploded view depicting a handle, a base having an area in a plane parallel to the plane of the underside working surface, a plurality of embedded adjustable levels in said area, and a snap-on tray for blade interchangeability providing an underside working surface with one snap shown. In one embodiment, and alternatively not shown, the snap could be replaced with quarter-turn fastener(s), or the top side of the blade could be outfitted with a magnet means to mate with a magnetic underside of the base.
Figure 3:
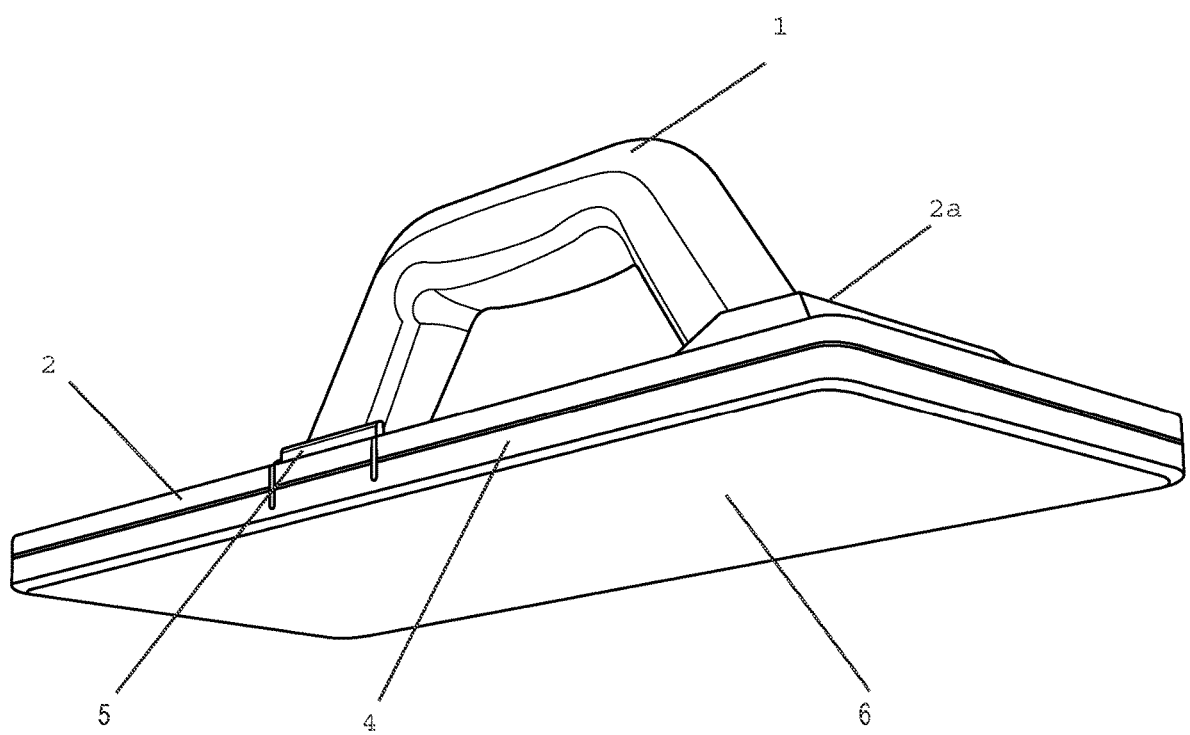
FIG. 3 depicts one embodiment of a bottom perspective view of a trowel as disclosed herein with a view from underneath depicting a handle, a base having an area in a plane parallel to the plane of the underside working surface, and the underside of a snap-on tray for blade interchangeability.
Figure 4:
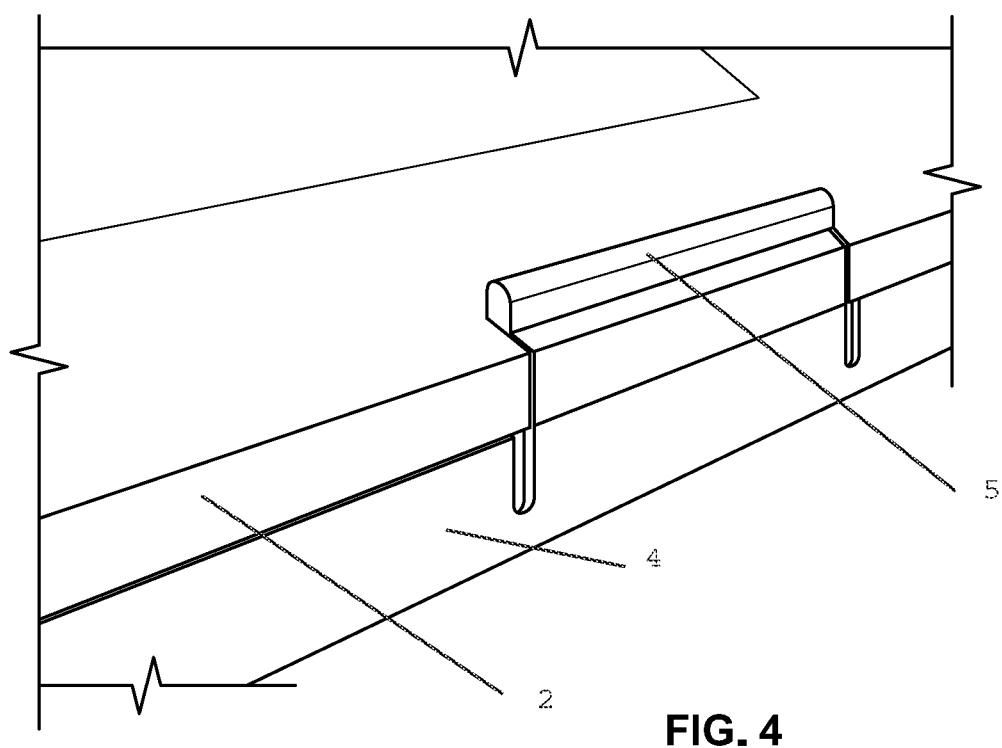
FIG. 4 depicts one embodiment of a close-up view of a portion of a trowel as disclosed herein depicting a snap of a snap-on tray, that fits over and snaps onto a base, for blade interchangeability.
Figure 5:
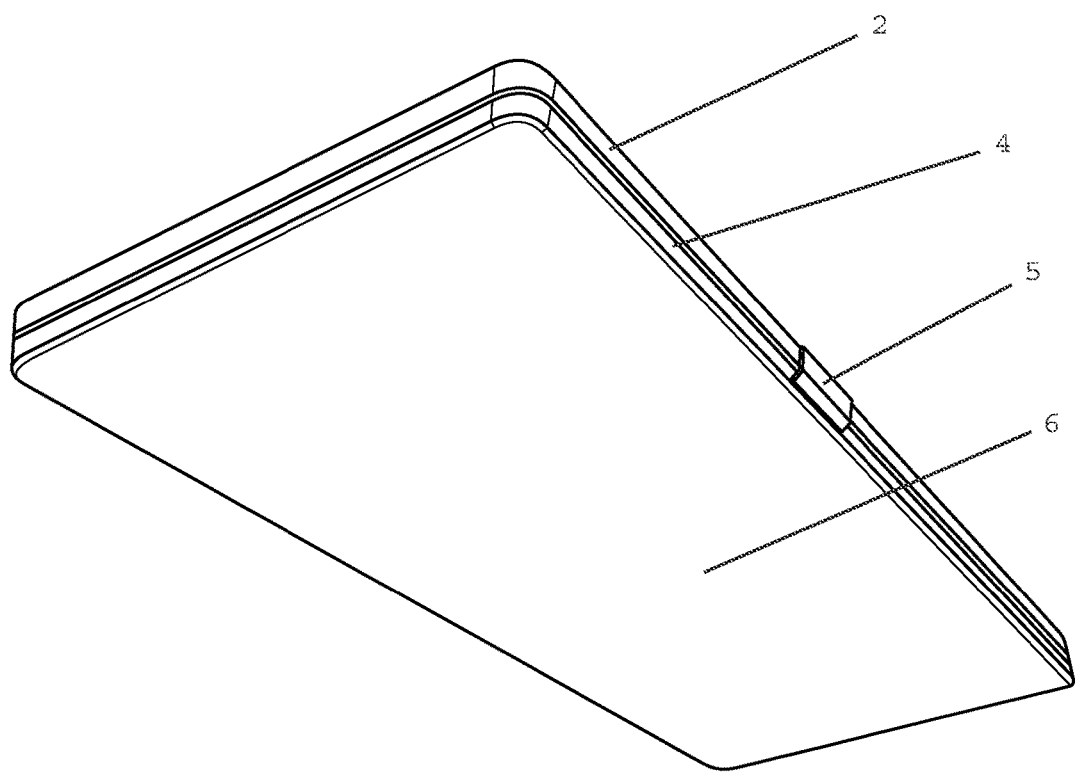
FIG. 5 depicts one embodiment of a close-up view of the underside of a snap on tray of a trowel as disclosed herein depicting a blade with a smooth underside working surface, which may in alternative embodiments have teeth or a ridged underside working surface to provide some bite in gripping mortar to be spread making the process easier and more effective.
Figure 6:
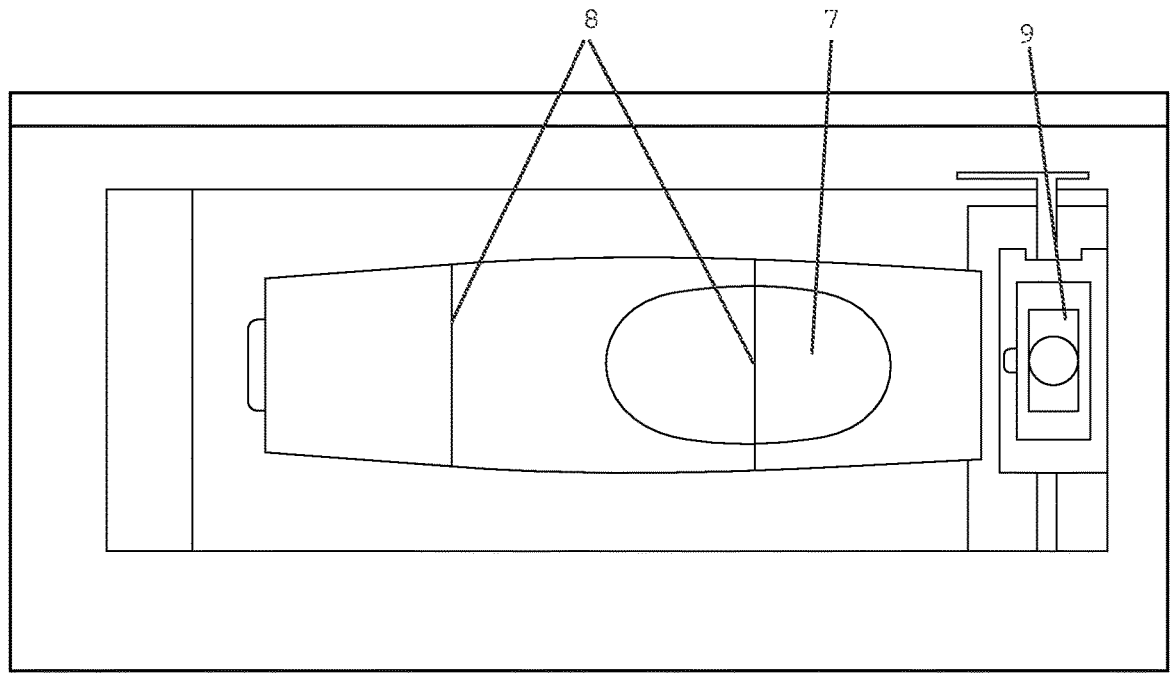
FIG. 6 depicts one embodiment of a close-up of one level as used within the trowel as disclosed herein depicting a spirit level with a bubble that indicates a degree of levelness with index lines and an adjustment mechanism to vary the degree of offset of the level with respect to the plane of the blade. When the level is adjusted to be co-planar with the base in which it is housed, which in turn is in a parallel plane with the plane of the base and the plane of the blade and underside working surface, said level is also in a parallel plane with the plane of the blade and underside working surface. When the level is adjusted, the level is in a plane the adjusted number of degrees out of parallel plane with the plane of the blade and the underside working surface. Any or all of the levels used in the base may be so adjustable.

In one embodiment, there may be any number of known attachment means for replaceably attaching the blade to the base. For example, and not by way of limitation, the blade could attach to the base by way of magnets—the blade comprising cross members of magnetized material (11) that would mate with base magnets (not shown) in a corresponding area of the underside of the base (as shown in FIG. 2).

In one embodiment, the base and handle are molded in one contiguous unit to prevent any liquid infusion. In an alternative embodiment, the handle and base are separately molded and then permanently attached using ultrasonic assembly to achieve the same result.

In one embodiment, the handle has a rubberized overlay for better handling in wet environments.

EXAMPLES

The present invention is further illustrated, but not limited by, the following examples.

Use of a trowel or float has always been a matter of skill and judgment. Holding a set angle to achieve and ideal slope of ½" in height every 12" in length is difficult. But, with built in levels, maintaining a specific slope is a matter of holding a particular level index. Alternatively, a level could be adjustable so that an adjustment could be made so that the user maintains the new "horizontal level" which in actuality, translates to an underside plane that is in fact, a desired slope.

When installing a mud floor or a shower floor, a ribbon is run around the perimeter of the space. Pressure is used from the outside inwards (or towards the drain location). Utilizing the levels, a constant and similar pressure is easily maintained resulting in a constant and uniform pitch. As noted above, maintaining the specific slope is a matter of holding a particular level index or, alternatively, setting an adjustable level so that a new horizontal is established, making the process even easier. Thus, in an embodiment with an adjustable level, a user adjusts the level so that a blade with an angle is set to a level with a bubble in the center making it easier and more consistent to use.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A modular component trowel, comprising:
   a handle configured to attach to and detach from a base at two points;
   said base having a substantially flat underside configured to accept a correspondingly configured blade, said blade having a configuration to replaceably attach and detach to and from said underside of said base and when attached, cover the entire underside of said base and said base further comprising at least one upper surface that is in a plane parallel to the plane of the underside of the base;
   two levels configured to be set in place into a replaceable housing mounted into said upper surface in said base that is in a plane parallel to the plane of the underside of the base and wherein said two levels are in 90° orientation to each other and both said levels are adjustable; and
   said base further having a configuration such that when attached, said blade is attached in a plane parallel to the plane of the underside of the base and said blade further configured to contain at least one attachment area that is substantially rigid and one working surface area having a chosen surface area property.

2. The trowel of claim 1 wherein the handle and base are made from non-stick plastic.

3. The trowel of claim 1 wherein the blade is a composite where one material is wood and the other is plastic.

4. The trowel of claim 1 wherein the blade is a composite of two dissimilar materials.

5. The trowel of claim 1 wherein said configuration for replaceably attaching said blade to said underside of said base is via snaps.

6. The trowel of claim 1 wherein said configuration for replaceably attaching said blade to said underside of said base is via magnets.

7. The trowel of claim 1 wherein said configuration for replaceably attaching said blade to said underside of said base is via a quarter turn fastener.

8. The trowel of claim 1 wherein the chosen property for the surface area of the blade is smooth.

9. The trowel of claim 1 wherein the chosen property for the surface area of the blade is that it has a molded in texture to provide tooth.

10. The trowel of claim 1 wherein the chosen property for the surface area of the blade is that it has a wood composite attachment.

11. The trowel of claim 1 wherein the chosen property for the surface area of the blade is that it has angled ridges.

* * * * *